Patented June 5, 1923.

1,457,319

UNITED STATES PATENT OFFICE.

BERT A. STAGNER, OF PITTSBURGH, PENNSYLVANIA, ASSIGNOR TO NATIONAL RETARDER COMPANY, OF CHICAGO, ILLINOIS, A CORPORATION OF OHIO.

GROWING OF YEAST.

No Drawing.   Application filed July 25, 1919. Serial No. 313,332.

*To all whom it may concern:*

Be it known that I, BERT A. STAGNER, a citizen of the United States, residing at Pittsburgh, in the county of Allegheny, State of Pennsylvania, have invented certain new and useful Improvements in the Growing of Yeast; and I do hereby declare the following to be a full, clear, and exact description of the invention, such as will enable others skilled in the art to which it appertains to make and use the same.

This invention relates to improvements in the growing of bakers' yeast of good color, odor and keeping qualities and having good baking strength when used in the manufacture of leavened bread.

In the growing or propagation of bakers' yeast a considerable amount of nitrogenous food material is essential. It is, moreover, important to insure that the nitrogenous food material supplied is of suitable character and quality, so that the formation of objectionable by-products, such as would impart to the yeast, and to the bread made therewith, an objectionable odor or flavor, or a dark color, or such as would weaken the baking strength of the yeast, are avoided. Inasmuch as yeast is itself a vegetable growth, it has been the common and almost universal practice in the art to employ malt sprouts as the nitrogenous food material in the growing of bakers' yeast, the yeast being thereby supplied with nitrogenous food material of vegetable origin.

I have discovered that yeast of good color, odor and keeping qualities, and having good baking strength when used in the manufacture of leavened bread, can be successfully and advantageously grown with the aid of nitrogenous food material of animal origin, provided this food material is properly prepared. The animal proteins themselves are not suitable for use as yeast food; but I have found that if materials containing a preponderance of collagen, as hereinafter set forth are properly selected and prepared, and subjected to hydrolysis with lime, the resulting products of hydrolysis provide a valuable nitrogenous food for use in the growing and propagation of bakers' yeast. Lime is a particularly good hydrolyzing agent because it combines with and precipitates the sulphur that oftentimes occurs with collagen, and which if not removed gives an unpleasant odor and a dark color to the resulting product.

After extensive investigations I have found that in order to produce a proper yeast food that the degree of hydrolysis is most important. A mere solution of the collagen-containing material is not sufficient because the protein molecule is still too complex for assimilation by the yeast cells. On the other hand I have found that if the hydrolysis is carried too far and the collagen material broken down to the ultimate amino acids that a very poor yeast food is produced. The best yeast food is produced by carrying the hydrolysis to an intermediate degree in which some of the nitrogen occurs in the amino acids and some in the less complex proteoses. After trying various hydrolyzing agents, both acid and alkaline, I have found that the only really satisfactory hydrolyzing agent is lime. Acid hydrolysis gave a poor yeast food that was of disagreeable odor and was difficult to filter. I have found that a very satisfactory yeast food is produced from collagen-containing materials by hydrolyzing hides with lime under the conditions set forth in the specific examples below.

Collagen is a constituent of hides, bones, cartilage, tendoms, fish scales, and is sometimes termed glutin. Oftentimes the sclero-protein elastin occurs with the collagen; in case it does, there is no necessity for separating the two sclero-proteins because both may be hydrolyzed to give a yeast food. When such animal proteins are to be used for purposes of the present invention, they should be properly selected, so that they will be free from any objectionable properties or ingredients.

In the practice of the process of the present invention, the collagen-containing material, after proper selection and preliminary treatment, is subjected to hydrolysis with lime and water at an elevated temperature, for example, by heating hides, fish scales or ligaments in a closed autoclave at a temperature of about 160° to 180° C., in the presence of sufficient lime and water and for a sufficient length of time, so that all or substantially all of the material will become soluble. The resulting solution is then filtered and the filtrate evaporated to dryness. The resulting product may then be pulverized and is adapted for use in the process of the present invention.

For example, hides, which consist largely of collagen, may be heated in an autoclave for a period of from three to ten hours at a temperature of around 160° to 180° C., 400 parts of the hides being used with 40 parts of lime and 1600 parts of water. The temperature and time should be so regulated that the hydrolysis is carried to a degree sufficient to break down the collagen to the less complex proteoses but without carrying it to the stage such that most of the protein is broken down to the various amino-acids. At the end of the hydrolysis the lime may be neutralized by adding a little sulfuric acid, and after filtration of the sludge and precipitated calcium sulfate, the solution can be evaporated to give the product in a dry state, or the solution may be used directly, after such evaporation and concentration as may be necessary or desirable.

A yeast nutrient can similarly be prepared from elastin, for example, by subjecting ligaments, such as the ligamentum nuchæ, to hydrolysis, using about 400 parts of ligaments (on a dry basis), 40 parts of lime, and about 1600 parts of water, and heating in an autoclave at around 160° to 180° C., for a period of from about three to ten hours. The resulting product is then filtered and can then be evaporated to dryness or used in the form of a more or less concentrated solution.

The products produced as above described have a high nitrogen content, and are in a form readily available to the growing yeast. In the practice of the invention, such hydrolyzed collagen is associated with the carbohydrates or carbohydrate substances, and with the yeast, and the growth of the yeast is then permitted to take place under conditions similar to those commonly employed when malt sprouts are used as the nitrogenous nutrient.

If sufficient nitrogenous food material is not present, the growth of the yeast is retarded, and the yeast tends to autolize itself and to ferment the carbohydrates with the resulting production of alcohol and carbon dioxide, rather than itself increase in weight of yeast. It is accordingly important to provide sufficient nitrogenous food material so that the desired increase in yeast will take place. The hydrolyzed collagen, although of high nitrogen content, can, nevertheless, be used in sufficiently large amounts to insure rapid yeast growth without objectionable formation of by-products of objectionable color, odor or taste.

Instead of adding the dried products of hydrolysis to the yeast and other ingredients, the solution resulting from the hydrolysis may be directly used, after neutralization of the lime and filtration to remove the sludge and calcium sulfate. When the dried products of hydrolysis are employed, it is preferable to first dissolve them in water to form a solution. It is of advantage to prepare the product in a dry form, where it is to be shipped or stored.

The following specific example will further illustrate the practice of the invention.

29 parts by weight of hydrolyzed keratin or collagen or elastin are added to a mash made of about 800 parts of grains such as mixed corn, barley and rye, and five parts by weight of yeast are added to the aqueous extract thereof, and permitted to develop in the usual way. The resulting yeast is of good color, odor and keeping qualities, and is comparable with bakers' yeast obtained when malt sprouts are employed as the source of nitrogenous material. The yeast has good baking strength and is well adapted for use in the manufacture of leavened bread. It can be used directly for bread making, or it can be converted into the form of compressed yeast or into the form of a dry cake.

In the growing of the yeast, it will, of course, be understood that the products of hydrolysis above referred to are not of themselves sufficient for the growing of yeast without the association therewith of added carbohydrates, inasmuch as such hydrolysis products are essentially nitrogenous in character. Accordingly, as above indicated, a carbohydrate or mixture of carbohydrates should be associated with the hydrolytic products, such as, for instance, sugar, or the filtered wort obtained from corn, rye, barley or other grains.

The products of hydrolysis of the collagen-containing material above referred to have the advantage, due to their nitrogenous character, of permitting a saving in the amount of grain commonly required when malt sprouts are used. They present the further advantage of providing a satisfactory nitrogenous yeast food in a highly concentrated form and free from objectionable ingredients, prejudicial to the yeast growth and to the desired properties of bakers' yeast. They, nevertheless, enable a satisfactory and merchantable yeast to be produced, which is well adapted for use, in the form of yeast foam, compressed yeast, etc., for baking purposes, in the manufacture of leavened bread.

In a companion case, Serial No. 313,333, filed of even date herewith, I have claimed specifically the process in which products of hydrolysis of elastin or elastin-containing substances are employed, whereas the specific claims of the present case are directed to the process in which products of hydrolysis of collagen or of substances containing a preponderance of collagen are employed. So also in my companion application, 243730, filed July 6, 1918, I have specifically claimed the process in which products of hydrolysis of keratin or keratin-containing substances are employed.

The yeast food and the method of producing the same described herein are described and claimed in the co-pending application, filed December 11, 1922, Ser. No. 606,291.

I claim:

1. The method of growing bakers' yeast of good color, odor, and keeping qualities, and having good baking strength in the manufacture of leavened bread, comprising growing said yeast with nutrient mediums containing suitable carbohydrate material and a nitrogenous yeast food made by hydrolyzing collagen containing material with lime and water at an elevated temperature.

2. The method of growing bakers' yeast of good color, odor and keeping qualities, and having good baking strength in the manufacture of leavened bread, comprising growing said yeast with nutrient mediums containing suitable carbohydrate material and a nitrogenous yeast food made by hydrolyzing material containing a preponderance of collagen with lime and water at an elevated temperature.

3. The method of growing bakers' yeast of good color, odor and keeping qualities, and having good baking strength in the manufacture of leavened bread, comprising growing said yeast with nutrient mediums containing suitable carbohydrate material and a nitrogenous yeast food made by hydrolyzing animal protein with lime and water at an elevated temperature.

4. The method of growing bakers' yeast of good color, odor and keeping qualities, and having good baking strength in the manufacture of leavened bread, comprising growing said yeast with nutrient mediums containing suitable carbohydrate material and a nitrogenous yeast food made by subjecting 400 parts of material containing a preponderance of collagen to hydrolysis by heating with 40 parts of lime and 1600 parts of water at a temperature of about $160°$ to $180°$ C. for a period of 3 to 10 hours.

In testimony whereof I affix my signature.

BERT A. STAGNER.